Nov. 17, 1970   W. VETTERMANN ET AL   3,541,363
STEP MOTOR WITH P-M ROTOR AND SHAPED CLAW TOOTH STATOR POLES
Filed Oct. 28, 1968   2 Sheets-Sheet 1
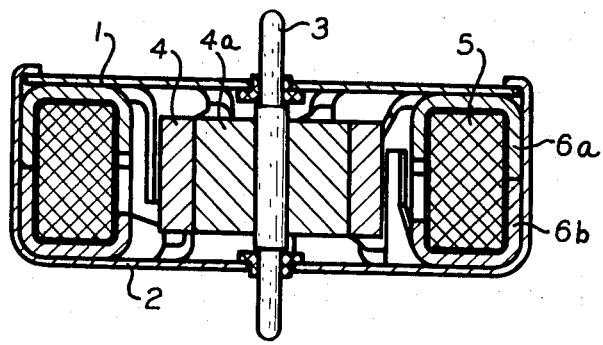
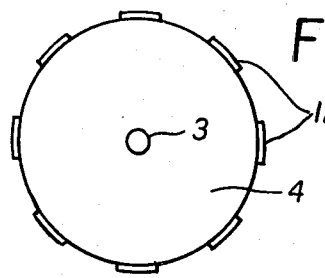 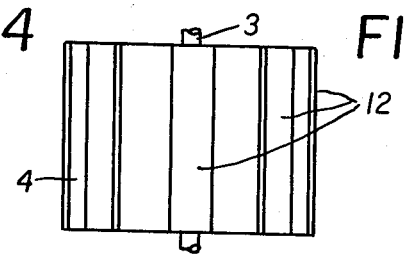
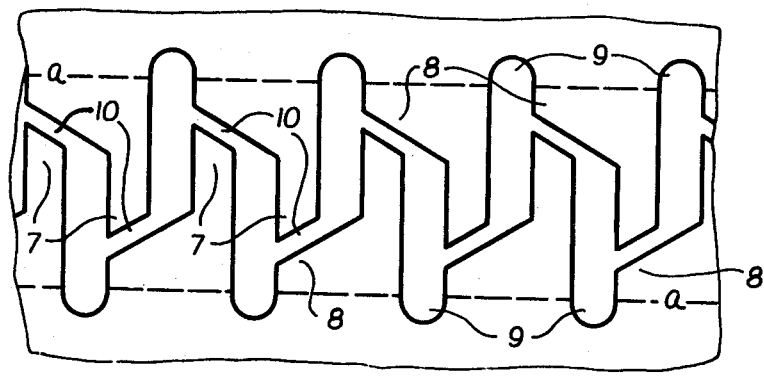
*INVENTORS*
WOLFGANG VETTERMANN
BY ROLAND SUDLER
ATTORNEY.

United States Patent Office 3,541,363
Patented Nov. 17, 1970

3,541,363
STEP MOTOR WITH P-M ROTOR AND SHAPED CLAW TOOTH STATOR POLES
Wolfgang Vettermann and Roland Sudler, Frankfurt am Main, Germany, assignors to VDO Tachometer Werke Adolf Schindling GmbH, Frankfurt am Main, Germany, a corporation of Germany
Filed Oct. 28, 1968, Ser. No. 770,929
Claims priority, application Germany, Oct. 28, 1967, 1,613,479
Int. Cl. H02k 1/12, 21/12, 37/00
U.S. Cl. 310—49
6 Claims

ABSTRACT OF THE DISCLOSURE

A one-phase stepping motor for electric control by alternating voltages or direct voltages switchable in a cycle with any, particularly small switching frequencies and with a permanent magnetic polarized rotor of uniform individual rotor poles and alternating polarity, as well as a claw tooth stator with two stator poles disposed opposite the rotor poles and toroidal coil windings for excitation of the stator poles, each including a plurtlity of main poles and a plurality of alternating auxiliary poles. The main poles of one rotor pole and the auxiliary poles of the other rotor pole, oppositely polarized and axially displaced, with a smaller pole face relative to that of the main pole. The auxiliary pole is connected with the main pole and disposed in the direction of rotation of the rotor forming an L-shaped pole face The auxiliary pole is magnetically separated from the preceding main pole by a pole gap.

---

The present invention relates to electric stepping motors which perform a rotary movement of defined extent during switching-on, switching-off or reversing of the electrical excitement, which retain the prevailing position, however, independently from the duration of the excitement.

The present invention relates in particular to a one-phase stepping motor for electrical setting by alternating voltages or direct voltages switchable in a cycle with any, particularly small switching frequencies and with a polarized rotor of uniform pole distribution and of a polarity alternating in peripheral direction as well as a claw tooth stator having stator poles of equal number and disposed opposite the rotor poles, which stator poles are excitable by coil windings and which comprise each a main and an auxiliary pole.

A known embodiment of such stepping motor uses a ring coil stator in a magnetizable sheet metal jacket with comb-like interlocking poles of alternating polarity and bent over from the end faces onto the inner cylinder face of the stator, which poles are disposed opposite the poles of the multi-pole ring armature. This stepping motor has, however, the drawback of a small starting moment of undefined starting direction during the change of the poles and requires additional means for locking the movement of the rotor in the non-desired rotary direction. By iron reinforcement of the armature with pole teeth as well as with one-sided deformation of the stator pole teeth or arrangement in different radial distances, these drawbacks can be balanced out only insufficiently.

Furthermore, embodiments of stepping motors with a bell- or disc-shaped soft-iron armature are known in which perforations or projections of the pole sheets cause magnetic preference positions on which the armature adjusts itself upon exciting the stator coils (German Pats. No. 146,595 and No. 948,631). In these embodiments a definite direction of rotation is brought about by asymmetric arrangement of the oppositely disposed poles of the rotor and stator. In addition to the low achievable torque, these embodiments have still the drawback of the lacking of holding moments in its currentless state.

In other known stepping motors a denfied direction of rotation is forced by auxiliary poles, which are caused by phase-displaced currents in short-circuit rings or auxiliary coils. Since, however, such short-circuit currents can be obtained only during the connection or disconnection of the main field excitation, its duration of effect is only short and nearly without importance for the torque formation particularly in case of low switch frequencies (Siemens motor type SP 23).

It is one object of the present invention to provide a one-phase stepping motor, wherein the drawbacks of the known embodiments are avoided, which delivers a higher torque and is simply produced .

It is another object of the present invention to provide a one-phase stepping motor, wherein for each rotor pole of the multi-pole designed rotor designed as a cylinder-shaped permanent magnet with a high coercive magnetizing force, a main pole and an oppositely polarized auxiliary pole, displaced axially, of the claw tooth stator with a smaller pole face relaive to the main pole are opposed and wherein the auxiliary pole is connected with the main pole adjacent in the direction of rotation of the rotor and becoming effective during the next switching step and has towards this main pole an increasing magnetic transmission, while it is separated by a pole gap from the other adjacent main pole of equal polarity. In a stepping motor with a stator ring coil and pole sheets cuplike surrounding the latter with teeth which are bent over from the end faces onto the inner cylindrical face of the stator and comb-like interlocking each other and constitute the main poles with alternating polarity, the auxiliary poles are formed by projections of the main poles extending into the comb-gaps, which main poles are disposed in axial direction opposite the main poles of opposite polarity. By this arrangement the increasing magnetic transmission from the auxiliary poles to the main poles is brought about by a limit of the auxiliary poles, inclined towards the axial direction. The gap between the auxiliary pole and the adjacent main pole of equal polarity and between the main poles of unequal polarity is equal or larger than the width of the main poles which are designed inclined, corresponding with the limit of the auxiliary poles disposed opposite in axial direction. By this arrangement the two pole sheet cups of the stator have symmetric design so that its production is made possible with the same punching cut.

By this formation and arrangement of the main and auxiliary poles a high starting moment is obtained upon reversal of the excitation and thereby pole change of the stator poles for the start of a rotary step and simultaneously a high holding moment after turning into the new standing position and removal of the excitation.

By suitable dimensioning of the form and the size of the main and of the auxiliary poles as well as of the width of the air gap required for a magnetic separation between their obliquely extending limits, the holding moment can be brought to the same size as the stepping moment created upon excitation. Furthermore, an influencing of the moment performance during the stepping movement is possible by suitable formation of the transforming curve of the oblique transfer from the auxiliary pole to the main pole.

A further improvement of the moment performance during the stepping movement of the rotor can be obtained by its fortification with thin ferromagnetic pole sheets, the thickness of which is dimensioned such that they are saturated already by a portion of the stator magnetic flux. These thin sheets have preferably the length of the rotor and their width is preferably equal or smaller than the width of the main pole. By this arrangement, on the one hand a reduction of the magnetic resistance for the magnetic flux, stator main pole-rotor-stator-auxiliary pole, is brought about to a degree limited by the saturation and, on the other hand a stray field reduction and a concentration of the flux emergence from the rotor is obtained. As a result of these effects, an appreciable increase of the efficiency of the stepping motor in relation to the used exciting output is brought about and furthermore an increase of the blank steepness and a flattening of the high points of the torque curve over the rotary angle.

With these and other objects in view which will become apparent in the following detailed description, the present invention, which is shown by example only, will be clearly understood in connection with the accompanying drawings, in which:

FIG. 1 is an axial section of the stepping motor, designed in accordance with the present invention;

FIG. 2 is a development of the inner cylinder jacket of the pole sheet cups;

FIG. 4 is a top plan view of the rotor; and

FIG. 5 is a side elevation of the rotor.

Figure 3A:
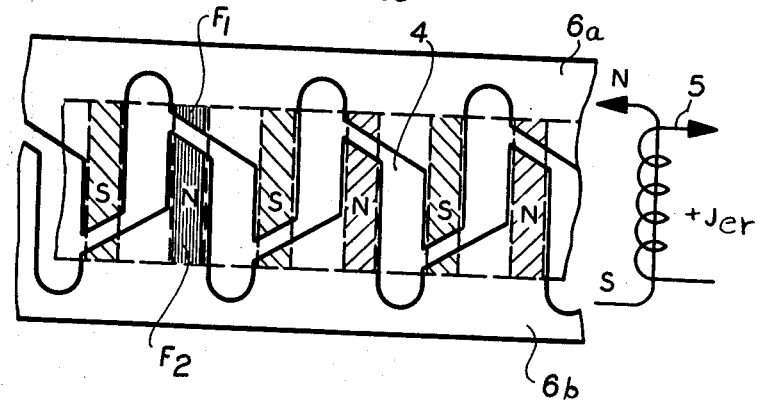
FIGS. 3a–3c show the polarization of the stator poles during the switching steps in an unwound showing, depicting different positions.

Referring now to the drawings, and in particular to FIGS. 1 and 2, in a base plate 1 and the end side of a housing 2 secured thereto, a magnet rotor 4 is mounted on axle 3. The rotor 4 comprises a hollow cylinder of permanent magnetic material of a high coercive magnetizing force, by example, barium or strontium ferrite and disposed on a preferably nonmagnetic core 4a. The magnetic poles are magnetized on the outer cylinder jacket in such a manner that poles of alternating polarity succeed one another around the periphery of the rotor and each pole extends over the length of the rotor. Concentrically about the rotor 4 is arranged a ring coil 5 which is surrounded by both pole sheet cups 6a and 6b.

The pole sheets 6a and 6b are bent over from the end faces into the inner cylindrical face of the stator about the ring coil 5 and alternately comprise comb-like interlocking tooth shaped poles, which constitute the main poles 7 of the claw tooth stator. The auxiliary poles 8 follow the main poles 7 in the shape obliquely limited projections, which auxiliary poles 8 are magnetically separated by a pole gap 9 (FIG. 2). Accordingly, the stator poles comprise main poles 7 and shorter auxiliary poles 8, alternating therewith, each pole being cut on an oblique at the end. The upper set of poles are displaced circumferentially with respect to the lower set such that a main pole 7 in one set is opposite an auxiliary pole portion in the other set in an axial direction. The bending lines between the end faces and the inner cylindrical face of the pole sheet cups are indicated in the development by the dotted lines a. One main pole each of one row of teeth of one pole sheet cup cooperates with an auxiliary pole of the other pole sheet cup disposed oppositely in axial direction. A continuous magnetic transfer from one auxiliary pole to the main pole connected therewith is obtained by the oblique limit, which, however, can also have another curve shape for achieving a desired torque performance. The main poles disposed axially opposite the auxiliary poles are, in accordance with the oblique limit of the auxiliary poles, likewise formed abliquely, so that each main pole is separated by a narrow air gap 10, oblique to the axial direction, from the auxiliary pole of smaller force cooperating with the main pole, the auxiliary pole also being set off in axial direction relative to the main pole. The stator poles stand opposite the rotor poles with a small radial air gap and since the polarity of the two pole sheet cups is different, always one main pole and an oppositely polarized auxiliary pole of a smaller face of the stator cooperate witht a rotor pole.

Figure 3B:
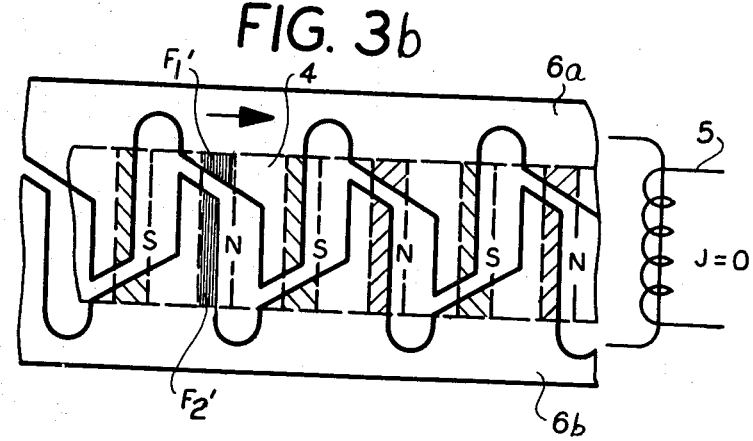
Figure 3C:
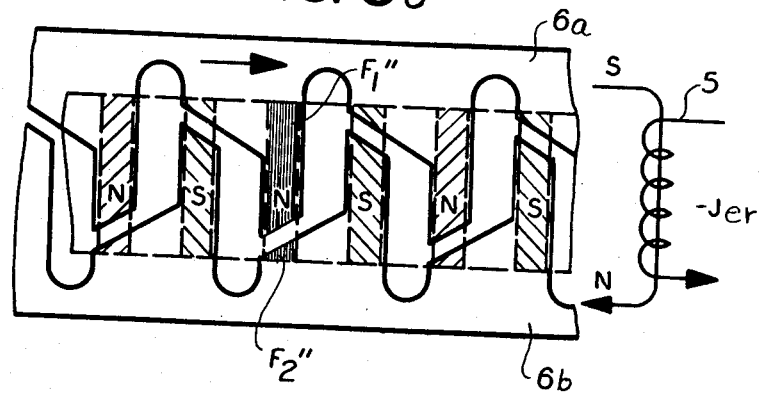

The functional performance of the switching steps is shown schematically as a development in FIGS. 3a to 3c. In accordance with FIG. 3a, at first, the exciting of the ring coil 5 of the stator takes place by the exciter current $I_{er}$ such that in all pole teeth of the upper pole sheet 6a north poles are created and in all pole teeth of the lower pole teeth 6b south poles are created. Then, the rotor adjusts itself such that its north poles (emphasized cross-hatched) with largest possible face $E_2$ are disposed opposite the stator south poles and an optimum magnetic flux connection is obtained over the end faces and the outer cylinder jacket face with surrounding of the exciting coil, whereby the repelling effect of the smaller part face $F_1$ of the oppositely magnetized auxiliary pole 8, where equal poles are disposed opposite each other, only a slight displacement of the rotor poles in the direction of the pole gaps 9 can be enforced, without causing an appreciable reduction of the effective face $F_2$ of the main pole.

FIG. 3b shows the position of the rotor with its poles at a standstill upon removal of the exciting current. By this arrangement, the magnetic flux of the rotor is increased on the short way over the pole teeth (main pole and auxiliary pole) and the oblique air gap 10 without surrounding appreciably the exciting coil and causes a slight displacement of the rotor towards the right, so that the part faces $F_1$ increase to $F_1'$ the part faces $F_2$ being reduced to $F_2'$ and a new equilibrium position is obtained in which the magnetic resistance is reduced to a minimum and the flux is raised to a maximum, from which position a further rotation of the rotor is possible only after overcoming the holding moment. This is in the design, arrangement and dimensioning of the poles in accordance with the present invention about equal to the size of the switching moment and causes a safe retaining of the obtained resting position without continuous requirement of an exciting output.

FIG. 3c shows the next switching step upon reversal of the flux in the exciting coil of the ring coil 5. All pole teeth of the upper pole sheet 6a become now south poles and all pole teeth of the lower pole sheet 6b become north poles. The north poles of the rotor standing at first in the position in accordance with FIG. 3a or 3b, are repelled by the effect of the part face $F_2$ and $F_2'$, respectively, while the part faces $F_1$ and $F_1'$, respectively, exert an attraction force, which increases with progressing rotary movement in the shown direction of the arrow, until the position of the rotor poles shown in FIG. 3c with the part faces $F_1''$ and $F_2''$ an exact reversal of the starting state is obtained, and thereby a further switching step is completed. By renewed reversal of the flux in the coil winding 5, upon performance of a further switching step with equal function performance, the original state according to FIG. 3a is obtained again. For the reversal of the direction of the current in the exciter coil, an alternating voltage with a frequency corresponding with the step succession can be made available or a direct current source can be used, which, in known manner, must be switchable within the cycle of the step succession.

By the symmetrical arrangement of the stepping motor in accordance with FIG. 1, it is brought about that the rotor sets itself automatically in the magnetic center of the stator and no appreciably axial forces can occur. Furthermore, by the arrangement of the pole sheet cups in accordance with the present invention, in combination with the ring coil and the compact closed structure, a favorable flow of the magnetic flux is present, which practically is directed exclusively centrally, so that the stray field remains particularly small.

As a further advantage it is to be emphasized that the parts can be produced with relative rough tolerance, since by the summation of the force effect of all individual poles no particular deviation of the total moment can result during successive switching steps.

The number of the magnet poles is selectable in wide limits and can be adjusted to the application purpose. As particularly favorable are found embodiments with 3–10 pairs of poles of rotor and stator, because with such pole pair numbers a particularly compact structure is made possible. For the optimum exploitation of the space and obtaining the largest possible torques, the pole gap 9 must be as wide or slightly wider, than the width of the main poles 7, in order that during further switching the influence in the direction of return rotation of the stator pole disposed backwardly relative to the rotary direction, remains low.

As shown in FIGS. 4 and 5, the rotor 4 can be provided with thin ferromagnetic pole sheets 12, the thickness of which is dimensioned such that they are saturated by a portion of the stator magnetic flux. These sheets 12 preferably are of the same length as the rotor and equal or smaller in width than that of the main poles 7. By this arrangement, on the one hand a reduction of the magnetic resistance for the magnetic flux, stator main pole-rotor-stator-auxiliary pole, is brought to a degree limited by the saturation and, on the other hand a stray field reduction and a concentration of the flux emergence from the rotor is obtained. As a result of these effects, an appreciable increase of the efficiency of the stepping motor in relation to the used exciting output is brought about and furthermore an increase of the flank steepness and a flattening of the high points of the torque curve over the rotary angle.

In addition to the above-described embodiment, the features essential for the present invention can be applied also in other structures, for instance with an outer rotor and immovable stator or a disc-like structure of the motor. By such variations in the structure, an adjustment to particular mounting or operation conditions are made possible.

If in some cases of application the balancing of the rotor after each switching step is disturbing, known means can be used, for instance, a directional lock or damping means can be used in known manner for reduction of these oscillations. The damping means can be advantageous inside of the hollow cylindrical rotor 4 between the latter and the motor shaft 3.

While we have disclosed one embodiment of the present invention, it is to be understood that this embodiment is given by example only and not in a limiting sense.

We claim:

1. A one-phase stepping motor for electric control by alternating voltages or direct voltages switchable in a cycle with any, particularly small switching frequencies and including a polarized rotor of uniform pole division constituting a plurality of individual rotor poles alternating in polarity in a circumferential direction, as well as a stator with an equal number of stator poles disposed for cooperation with said individual rotor poles, said stator poles forming two stator pole halves, said stator including at least one coil winding for excitation of said stator poles, wherein each of said stator pole halves comprise a plurality of main poles and a plurality of auxiliary poles alternating circumferentially, said two stator pole halves having opposite polarities, each of said auxiliary poles having one of said main poles circumferentially following in the direction of the running of the rotor and forming a substantially L-shaped pole face, said main poles of one of said stator pole halves and said auxiliary poles of the other of said stator pole halves, respectively, being oppositely polarized and axially displaced spaced realtive to each other, and having a smaller portion of said pole face of said auxiliary pole relative to the axially opposite portion of said pole face of said main pole, each of said main poles comprising a long arm extending approximately parallel to the rotor axis, each of said auxiliary poles comprising a shorter arm being magnetically separated from the previous main pole in the direction of rotation of said rotor by a pole gap, two pole bases on which said main poles and said auxiliary poles of said two stator pole halves, respectively, are arranged, said pole bases forming circles concentric to the rotor axis, and a transfer between the two arm sides which are adjacent to the previous main pole in the running direction of the rotor constitutes a curved shaped run.

2. The one-phase stepping motor, as set forth in claim 1, wherein said at least one coil winding is in the form of a ring coil, pole sheets surrounding cup-like said ring coil, said stator having end faces and an inner cylinder face, said pole sheets have comb-like interlocking tooth-shaped poles constituting said main poles of said two stator pole halves and of alternating polarity, respectively, and bent from said end faces onto said inner cylinder face of said stator, said pole gap between said auxiliary pole and the adjacent main pole of the same polarity and between said main poles, respectively, of opposite polarity is at least equal to the width of said main poles, and the transfer between the two adjacent arm sides of each stator pole half, which two arm sides are adjacent the previous main pole in the rotating direction of said rotor is a straight line oblique to the rotor axis.

3. The one-phase stepping motor, as set forth in claim 2, wherein said main poles disposed in axial direction opposite said auxiliary poles have at their ends a run corresponding to the curve shaped run of said transfer.

4. The one-phase stepping motor, as set forth in claim 2, wherein said cup-like surrounding pole sheets are of symmetric design.

5. The one-phase stepping motor, as set forth in claim 1, which includes thin soft-magnetic pole sheets provided on said rotor poles, the thickness of which is dimensioned such, that they are saturable already by a part of the stator flux.

6. The one-phase stepping motor, as set forth in claim 5, wherein said thin pole sheets have on said rotor poles the length of said rotor and their width is not larger than the width of said main pole.

References Cited

UNITED STATES PATENTS

| 3,119,941 | 1/1964 | Guiot | 310—49 |
| 3,164,734 | 1/1965 | Heinzen | 310—156 |

FOREIGN PATENTS

| 1,197,112 | 6/1959 | France. |
| 1,049,119 | 11/1966 | Great Britain. |

WARREN E. RAY, Primary Examiner

U.S. Cl. X.R.

310—156, 164, 257